United States Patent
Kaler et al.

(10) Patent No.: US 7,676,586 B2
(45) Date of Patent: Mar. 9, 2010

(54) HIERARCHICAL FEDERATION METADATA

(75) Inventors: Christopher G. Kaler, Sammamish, WA (US); Arun K. Nanda, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 11/538,916

(22) Filed: Oct. 5, 2006

(65) Prior Publication Data

US 2008/0086486 A1   Apr. 10, 2008

(51) Int. Cl.
   *G06F 7/00* (2006.01)
(52) U.S. Cl. .................. 709/229; 709/225; 707/100; 726/1; 726/2
(58) Field of Classification Search ........... 709/229, 709/225; 707/100; 726/1, 2
See application file for complete search history.

(56) References Cited

U.S. PATENT DOCUMENTS

| | | | |
|---|---|---|---|
| 5,535,322 | A | 7/1996 | Hecht |
| 6,151,624 | A | 11/2000 | Teare et al. |
| 6,792,605 | B1 | 9/2004 | Roberts et al. |
| 6,917,944 | B1 * | 7/2005 | Prasad et al. ............. 707/102 |
| 7,051,038 | B1 | 5/2006 | Yeh et al. |
| 7,065,527 | B2 | 6/2006 | McCartney et al. |
| 7,221,935 | B2 * | 5/2007 | Barriga-Caceres et al. ............. 455/414.1 |
| 2005/0050057 | A1 | 3/2005 | Mital et al. |
| 2005/0228798 | A1 | 10/2005 | Shepard et al. |
| 2005/0257139 | A1 | 11/2005 | Burst et al. |
| 2006/0021017 | A1 * | 1/2006 | Hinton et al. ............. 726/10 |
| 2006/0129645 | A1 | 6/2006 | Witriol et al. |
| 2006/0179425 | A1 | 8/2006 | Scougall et al. |
| 2006/0190580 | A1 | 8/2006 | Shu et al. |

OTHER PUBLICATIONS

Roantree, Mark, et al. "A Three-Layer Model for Schema Management in Federated Databases", Proceedings of 30th Hawaii International Conference on System Sciences, vol. 1, Jan. 1997, pp. 44-53.
Cai, Wentong, et al. "Automatic Construction of Hierarchical Federations Architecture", Proceedings of 6th International Workshop on Distributed Simulation and Real-Time Applications, 2002, pp. 50-57.

(Continued)

*Primary Examiner*—Wing F Chan
*Assistant Examiner*—Ruolei Zong
(74) *Attorney, Agent, or Firm*—Workman Nydegger

(57) ABSTRACT

Shared Federation Metadata. A data structures may be implemented in a networked computing environment including federation. A federation includes two or more organizations coupled in a fashion such that authentication and authorization statements span the organizations in accordance with a pre-defined policy. A computer readable medium may include a data structure. The data structure includes fields including at least one or more grouping of metadata about a first federation or about an organization within the first federation. At least one of the one or more groupings of metadata about the first federation or about an organization within the first federation are included in the data structure by a reference to a block of federation metadata, the block of federation metadata is used for at least one other federation or organization.

14 Claims, 2 Drawing Sheets

OTHER PUBLICATIONS

Cai, Wentong, et al. "Hierarchical Federations: An Architecture for Information Hiding", Proceedings of 15th Workshop on Parallel and Distributed Simulation, 2001, pp. 67-74.

Groβ, Thomas, et al., "Proving a WS-Federation Passive Requestor Profile", 2004, pp. 77-86, http://delivery.acm.org/10.1145/1120000/1111357/p77-grob.pdf?key1=1111357&key2=2383907511&coll=GUIDE&dl=GUIDE&CFID=940127&CFTOKEN=30315882.

Beatty, John, et al., "Web Services Dynamic Discovery (WS-Discovery)", Feb. 2004, pp. 1-35, http://xml.coverpages.org/WS-Discovery20040217.pdf.

Hau, Jeffrey, et al., "The ICENI Semantic Service Adaptation Framework", Aug. 14, 2003, pp. 79-86, http://www.doc.ic.ac.uk/~omj/RealityGrid/semantic.pdf.

* cited by examiner

HIERARCHICAL FEDERATION METADATA

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections.

Modern computers often include functionality for connecting to other computers. For example, a modern home computer may include a modem for dial-up connection to internet service provider servers, email servers, directly to other computers, etc. In addition, nearly all home computers come equipped with a network interface port such as an RJ-45 Ethernet port complying with IEE 802.3 standards. This network port, as well as other connections such as various wireless and hardwired connections can be used to interconnect computers.

Systems communicating with one another commonly facilitate that communication by complying with particular policies. These policies may be well known policies that are included in the software code of communication modules within a computing system. Alternatively, the general policies may be readily ascertainable by reference to a known source.

However, often there is a need for more information than just policy information to allow system communication. For example, federations may be established between different groups. A federation generally includes two or more organizations connected in a fashion such that authentication and authorization statements span the organizations in accordance with a pre-defined policy. In addition to the policy, federation members generally need to understand additional information, such as structure or organization information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein relates to data structures. The data structures may be implemented in a networked computing environment including federation. A federation includes two or more organizations coupled in a fashion such that authentication and authorization statements span the organizations in accordance with a pre-defined policy. A computer readable medium may include a data structure. The data structure includes fields including at least one or more grouping of metadata about a first federation or about an organization within the first federation. At least one of the one or more groupings of metadata about the first federation or about an organization within the first federation are included in the data structure by a reference to a block of federation metadata, the block of federation metadata is used for at least one other federation or organization.

Another embodiment is also implemented using data structures in a networked computing environment including one or more federations. A computer readable medium includes a data structure. The data structure includes fields including at least one or more grouping of metadata about a first federation or about an organization within the first federation. At least one of the one or more groupings of metadata about the first federation or about an organization within the first federation is inherited federation metadata included by inheritance from metadata for a second federation hierarchically above the first federation. As such the inherited federation metadata is inherited from the second federation by the first federation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

Some embodiments described herein illustrate various data structures and methods for providing federation metadata. For example, in one embodiment, a data structure can be used. The data structure includes fields including at least one or more grouping of metadata about a first federation or about an organization within the first federation. At least one of the one or more groupings of metadata about the first federation or about an organization within the first federation is included in the data structure by a reference to a block of federation metadata. The block of federation metadata may be used for at least one other federation or organization. In some embodiments, federation metadata is inheritable. For example, when a federation is formed from groups that are members of hierarchically higher groups that are already in a federation, the federation metadata from the hierarchically higher groups federation can be included by inheritance in the hierarchically lower groups federation. More specific examples are now illustrated in FIGS. 1A, 1B, and 1C.

Figure 1A:
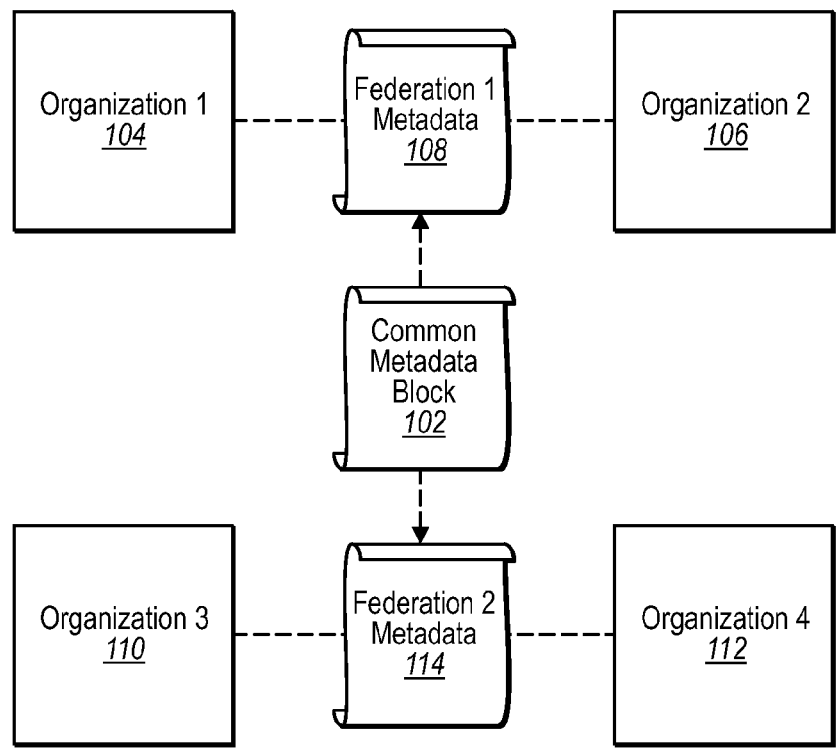
FIG. 1A illustrates a common block of federation metadata used for two federations.

FIG. 1A illustrates an example where a common metadata block 102 includes explicit metadata that is included by reference in the federation metadata of different federations. For example, FIG. 1A illustrates an organization 104 and an organization 106. Organization 1 104 and organization 2 106 are organized into a federation named federation 1. Information about the organization and structure of federation 1 is a block of federation 1 metadata 108. The federation 1 metadata 108 includes a reference to the common metadata block 102. Thus, the metadata in the common metadata block 102 is included in the federation 1 metadata 108 by reference to the common metadata block 102. For example, the federation 1 metadata 108 may include a pointer to explicitly defined metadata in the common metadata block 102.

FIG. 1A further illustrates a second federation, federation 2. Federation 2 includes organization 3 110 and organization 4 112. A block of federation metadata, federation 2 metadata 114 includes metadata, such as structure and organization metadata, for federation 2. Federation 2 metadata 114 includes the metadata in the common metadata block 102 by reference. Thus, FIG. 1A illustrates one example where metadata is explicitly set forth in one location, the common metadata block 102, but is included in metadata for a number of different federations.

In one embodiment, federation metadata included by reference is included by virtue of a reference to a federation identifier identifying a second federation. As such, the federation metadata of the second federation is applicable to the first federation and included in the first federation metadata. An example of this is illustrated in FIG. 1B.

Figure 1B:
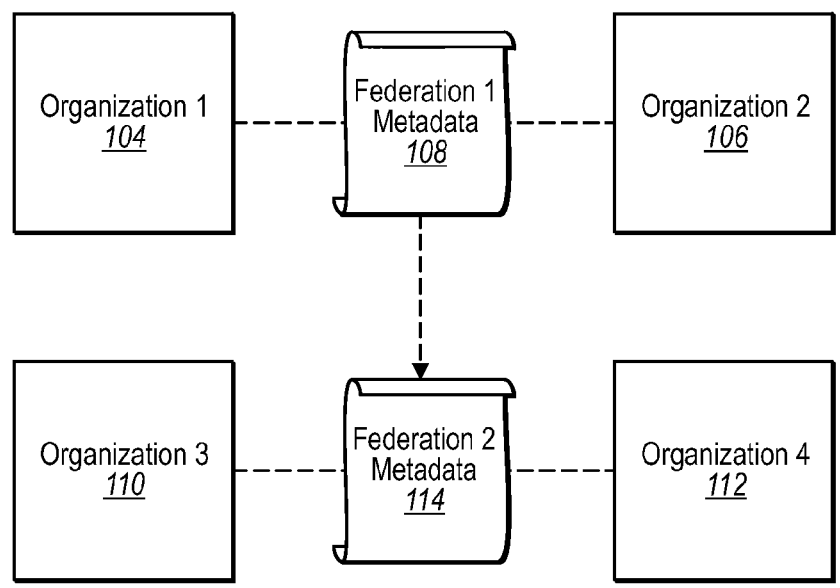
FIG. 1B illustrates federation metadata obtained from an existing federation.

FIG. 1B illustrates an example where federation metadata may be included by reference to an existing federation. FIG. 1B illustrates a federation 1 that includes organization 1 104 and organization 2 106. Federation 1 metadata 108 is used to describe information about federation 1. FIG. 1B illustrates a second federation, federation 2. Federation 2 includes organization 3 110 and organization 4 112. Federation 2 metadata 114 is used to describe information about federation 2. In the example illustrated, the federation 1 metadata 108 is included, by reference, in the federation 2 metadata 114 as illustrated by the broken arrow directed from federation 1 metadata 108 to federation 2 metadata 114. In one embodiment, federation metadata may include other federation metadata by reference to the other federation. Illustratively, in one embodiment, reference may be made to a federation identifier. Thus, in the example illustrated in FIG. 1B, federation 2 metadata 114 may include federation 1 metadata 108 by reference to the federation identifier for federation 1.

While in this example, reference is made to a single existing federation, reference may be made to one or more existing federations. For example, federation metadata for multiple federations can be used, by reference to the federations, as federation metadata for another federation.

In one alternative embodiment, federation metadata is included by reference to a name structure. For example, reference can be made to the structure of other federations. In the example illustrated in FIG. 1C, reference to a name structure for federation 1 can be expressed as Organization1-Organization2. Reference to a name structure for federation 2 can be expressed as Organization1/Team2-Organization2/Team3. Reference to a name structure for federation 3 can be expressed as Organization1/Team2/Group2-Organization2/Team3/Group3. Reference to a name structure for federation 4 may be expressed as Organization1/Team2/Group2/Individual2-Organization2/Team3/Group3/Individual3.

In another alternative embodiment, federation metadata included by reference is included by virtue of a reference to a physical location. For example, in one embodiment a reference may be made to a geographic physical location, such as at for example Seattle, Wash. In this example, when a federation is formed, where one or more of the parties to the federation are located in Seattle, Wash., a specific block of metadata specific to that location may be included by a reference to Seattle, Wash. This reference will cause a common metadata block to be included by reference in the federation metadata.

In yet another embodiment, the federation metadata included by reference is obtained from a service endpoint reference. Explicit federation metadata included in the federation metadata by reference is embedded within the service endpoint. As such, federation metadata may be obtained from the service endpoint by reference to the service endpoint.

In one embodiment, federation metadata included by reference may be fetched from a well known address given a target service address.

Explicit federation metadata included in the federation metadata included by reference may be obtained by reference to attributes in a directory. For example, directory services such as UDDI, DNS, or LDAP may include attributes which include the federation metadata that is included by reference.

Figure 1C:
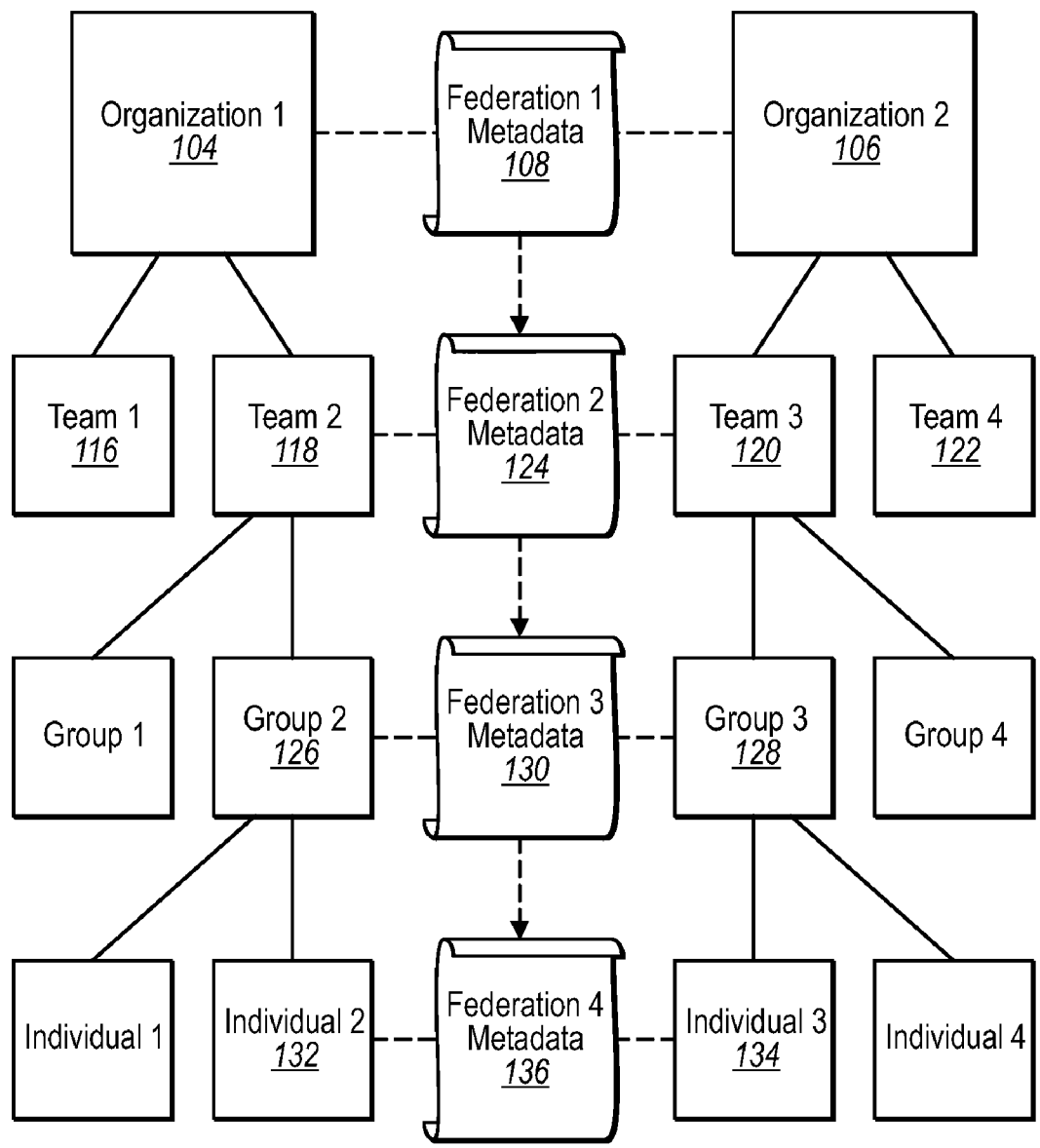
FIG. 1C illustrates federation metadata inherited hierarchically.

Referring now to FIG. 1C, an example is illustrated where federation metadata is inherited hierarchically. FIG. 1C illustrates a federation 1 which includes organization 1 104 and organization 2 106. Federation 1 metadata 108 includes information about federation 1.

Organization 1 104 can be subdivided, in this example, into at least two teams, team 1 116 and team 2 118. Similarly, organization 2 106 can be subdivided into at least two teams, team 3 120 and team 4 122. Thus, in this example, teams 1 and 2 116 and 118 are hierarchically below organization 1 104. Similarly, team 3 120 and team 4 122 are hierarchically below organization 2 106. FIG. 1C illustrates another federation, federation 2, which includes team 2 and team 3. Information about federation 2 is contained in federation 2 metadata 124.

Federation 2 metadata 124 is included in a data structure. The data structure includes fields including at least one or more grouping of metadata about federation 2 or about an organization within federation 2. At least one of the groupings of metadata about the first federation or about an organization within the first federation is inherited federation metadata included by inheritance. In this example, from federation 1 metadata for a federation 1 hierarchically above federation 2. As such the inherited federation metadata is inherited from the federation 2 by federation 1.

Further examples of inherited metadata are illustrated in FIG. 1C. For example, a federation 3 including group 2 126, which is hierarchically below team 2, and group 3 128, which is hierarchically below team 3 120 is shown. In this example, federation 3 is hierarchically below federation 2. As such, federation 3 metadata 130 includes federation 2 metadata 124. Similarly, federation 4, which includes individual 2 132 and individual 3 134 is hierarchically below federation 3. As such, federation 4 metadata 136 includes federation 3 metadata 130, federation 2 metadata 124, and federation 1 metadata 108.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise physical computer readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a networked computing environment comprising federations, wherein a federation comprises two or more organizations coupled in a fashion such that authentication and authorization statements span the organizations in accordance with a pre-defined policy, a method comprising a first computing system performing the following:
storing on a physical computer readable medium a data structure, wherein the data structure defines a communication policy for a federation including the first computing system, and comprises fields including at least one or more grouping of metadata about a first federation or about an organization within the first federation, the metadata including information about the organization and structure of the first federation or the organization within the first federation, wherein at least one of the one or more groupings of metadata about the first federation or about an organization within the first federation are included in the data structure without including explicitly defined metadata, but rather by a reference to explicitly defined metadata in a block of federation metadata in a different data structure, the block of federation metadata being used for storing metadata including explicitly defined information about the organization and structure of at least one other federation or organization;
wherein the data structure further comprising storing inherited federation metadata for the first federation, wherein the inherited federation metadata for the first federation is included in the data structure by virtue of the first federation being hierarchically below a second federation to which the inherited federation metadata also applies such that the inherited federation metadata is inherited from the second federation by the first federation; and
communicating with a second computing system in the federation using the communication policy.

2. The method of claim 1, wherein the federation metadata included by reference is included by virtue of a reference to a federation identifier identifying a second federation, such that federation metadata of the second federation is applicable to the first federation.

3. The method of claim 1, wherein the federation metadata included by reference is included by virtue of a reference to a name structure.

4. The method of claim 1, wherein the federation metadata included by reference is included by virtue of a reference to a physical geographical location.

5. The method of claim 1, wherein explicit federation metadata included in the federation metadata included by reference is obtained from a service endpoint reference, and wherein the explicit federation metadata included in the federation metadata included by reference is embedded within the service endpoint.

6. The method of claim 1, wherein explicit federation metadata included in the federation metadata included by reference is fetched from a well known address given a target service address.

7. The method of claim 1, wherein explicit federation metadata included in the federation metadata included by reference is obtained by reference to attributes in a directory including at least one of UDDI, DNS, or LDAP.

8. The method of claim 1, wherein the reference to a block of federation metadata comprises a reference to one or more existing federations.

9. In a networked computing environment comprising federations, wherein a federation comprises two or more organizations coupled in a fashion such that authentication and authorization statements span the organizations in accordance with a pre-defined policy, a method of obtaining metadata, the method comprising a first computing system performing the following:
referencing federation metadata for a first federation in a data structure field including at least one or more grouping of metadata about a first federation or about an organization within the first federation, the data structure defining a communication policy for a federation including the first computing system, the metadata including information about the organization and structure of the first federation or the organization within the first federations, wherein at least one of the one or more groupings of metadata about the first federation or about an organization within the first federation are included in the data structure without including explicitly defined metadata, but rather by a reference to explicitly defined metadata in a block of federation metadata in a different data structure, the block of federation metadata being used for storing metadata including information about the organization and structure of at least one other federation or organization at a location specified by a pointer wherein the federation metadata pointed to by the pointer second field is used for one or more federations in addition to the first federation;
applying the federation metadata to the first federation;
wherein the federation metadata further comprises inherited federation metadata for the first federation, wherein the inherited federation metadata for the first federation is included by virtue of the first federation being hierarchically below a second federation to which the inherited federation metadata also applies such that the inherited federation metadata is inherited from the second federation by the first federation; and
communicating with a second computing system in the federation using the communication policy.

10. The method of claim 9, wherein the federation metadata included by reference is included by virtue of a reference to a federation identifier identifying a second federation, such that federation metadata of the second federation is applicable to the first federation.

11. The method of claim 9, wherein the federation metadata included by reference is included by virtue of a reference to a physical geographical location.

12. The method of claim 9, wherein explicit federation metadata included in the federation metadata included by reference is obtained from a service endpoint reference, and wherein the explicit federation metadata included in the federation metadata included by reference is embedded within the service endpoint.

13. The method of claim 9, wherein explicit federation metadata included in the federation metadata included by reference is fetched from a well known address given a target service address.

14. The method of claim 9, wherein explicit federation metadata included in the federation metadata included by reference is obtained by reference to attributes in a directory including at least one of UDDI, DNS, or LDAP.

* * * * *